(12) United States Patent
Nishimura

(10) Patent No.: US 8,325,307 B2
(45) Date of Patent: Dec. 4, 2012

(54) CRYSTAL DISPLAY AND ELECTRONIC APPARATUS

(75) Inventor: Joji Nishimura, Matsumoto (JP)

(73) Assignee: Sony Corporation, Tokyo (JP)

( * ) Notice: Subject to any disclaimer, the term of this patent is extended or adjusted under 35 U.S.C. 154(b) by 500 days.

(21) Appl. No.: 12/571,650

(22) Filed: Oct. 1, 2009

(65) Prior Publication Data

US 2010/0097558 A1    Apr. 22, 2010

(30) Foreign Application Priority Data

Oct. 16, 2008  (JP) ................................. 2008-267145

(51) Int. Cl.
*G02F 1/1343* (2006.01)

(52) U.S. Cl. ...................................... 349/141; 349/146

(58) Field of Classification Search ........... 349/141–146
See application file for complete search history.

(56) References Cited

U.S. PATENT DOCUMENTS

| 7,095,471 B2 * | 8/2006 | Wu ................................ 349/141 |
| 2005/0237465 A1 * | 10/2005 | Lu et al. ......................... 349/141 |
| 2009/0033848 A1 * | 2/2009 | Oka et al. ....................... 349/114 |

FOREIGN PATENT DOCUMENTS

JP    2001-056476    2/2001

* cited by examiner

*Primary Examiner* — Mark Robinson
*Assistant Examiner* — Charles Chang
(74) *Attorney, Agent, or Firm* — K&L Gates LLP

(57) ABSTRACT

A liquid crystal display includes: a liquid crystal layer is interposed between a first substrate and a second substrate; a first electrode having a linear portion formed in the first substrate facing the liquid crystal layer; a second electrode having a linear portion formed adjacent to the first electrode; an insulating film disposed on the first electrode and the second electrode; a third electrode disposed on the insulting film correspond to the linear portion of the first electrode; and a fourth electrode disposed on the insulting film correspond to the linear portion of the second electrode. In the liquid crystal display, a voltage different from those of the second electrode and the third electrode is applied to the first electrode, and the first electrode and the second electrode are partially notched in the width direction of the linear portion in at least one side edge of the linear portion.

5 Claims, 13 Drawing Sheets

CRYSTAL DISPLAY AND ELECTRONIC APPARATUS

BACKGROUND

1. Technical Field

The present invention relates to a liquid crystal display and an electronic apparatus.

2. Related Art

For liquid crystal displays, vertical electric field methods, such as a TN (Twisted Nematic) mode, VA (Vertical Alignment) mode, and MVA (Multi-domain Vertical Alignment) mode, are widely used. However, lateral electric field methods are also known where the liquid crystal display includes the electrode only in one of the substrates. Among liquid crystal displays using the lateral electric field methods, the principle of operation for a liquid crystal display having an FFS mode is described with reference to FIG. 12 and FIG. 13 (see, for example, JP-A-2001-56476).

FIG. 12 is a schematic plan view of one pixel which is perspectively represented through a color filter substrate CF of a liquid crystal display 190 having an FFS mode used as an example in the related art. FIG. 13 is a cross-sectional view taken along the line XIII-XIII of FIG. 12.

The liquid crystal display 190 having an FFS mode includes an array substrate AR and a color filter substrate CF. The array substrate AR is provided with a plurality of scan lines 194 and a common interconnection 196 which are each parallel to a surface of a first transparent substrate 192, and provided with a plurality of signal lines 198 in a direction intersecting with these scan lines 194 and the common interconnection 196. And then, an opposite electrode (also referred to as a "common electrode") 200, formed of a transparent material such as ITO (Indium Tin Oxide) or IZO (Indium Zinc Oxide) connected to the common interconnection 196, is provided so as to cover each of the regions partitioned by the scan lines 194 and the signal lines 198. A pixel electrode 206, composed of a transparent material such as ITO in which a plurality of slits 204 is formed in the form of stripes, is provided in a surface of the opposite electrode 200 via an insulating film 202. Surfaces of the pixel electrode 206 and the plurality of slits 204 are coated by an oriented film 208.

A TFT, used as a switching element, is formed in the vicinity of the position in which the scan lines 194 intersects with the signal lines 198. The TFT is constituted so that a semiconductor 210 is disposed on a surface of the scan lines 194, a portion of the signal lines 198 extends to form a source electrode S in order to cover a portion of the surface of the semiconductor 210, and the scan line portion of a lower section of the semiconductor 210 forms a gate electrode G. In addition, the TFT is constituted so that a conductive layer overlapping with a portion of the semiconductor 210 forms a drain electrode D and the drain electrode D is connected to the pixel electrode 206.

In addition, the color filter substrate CF is constituted so that a color filter layer 214, an overcoat layer 216, and an oriented film 218 are disposed on a surface of a second transparent substrate 212. The array substrate AR and the color filter substrate CF are made opposite to each other so that the pixel electrode 206 and the opposite electrode 200 of the array substrate AR and the color filter layer 214 of the color filter substrate CF are opposed to each other. Next, a liquid crystal LC is sealed between the array substrate AR and the color filter substrate CF, and polarizing plates 220 and 222 are disposed in each of external sides of both substrates in order to be in the direction which makes polarizing directions thereof orthogonal to each other, so that the liquid crystal display 190 having an FFS mode is formed.

When an electric field arises between the pixel electrode 206 and the opposite electrode 200 in the liquid crystal display 190 having an FFS mode, as shown in FIG. 13, this electric field faces toward the opposite electrode 200 on both sides of the pixel electrode 206. Therefore, liquid crystals existing on the pixel electrode 206 as well as liquid crystals existing in the slit 204 can move.

However, a liquid crystal display having an FFS mode has a drawback in that it is difficult for the liquid crystal molecules between electrodes or on electrodes to twist depending on the strength or weakness of the electric field intensity, thereby lessening the brightness of a display.

Moreover, a liquid crystal display having an FFS mode has a problem in that it is necessary to form a lower electrode width with good accuracy and that an exposure margin is narrow, since a lower electrode is formed to be slightly wider than an upper electrode and be in a linear fashion. Therefore, the V-T characteristics can vary to a great extent due to a slight exposure deviation, and the brightness may be greatly lowered in extreme cases.

SUMMARY

According to a first aspect of the invention, a liquid crystal display is provided in which a liquid crystal layer is interposed between a first substrate and a second substrate to constitute a plurality of sub-pixel regions. The liquid crystal display includes: a first electrode having a linear portion formed in the first substrate facing the liquid crystal layer; a second electrode having a linear portion formed adjacent to the first electrode; an insulating film disposed on the first electrode and the second electrode facing the liquid crystal layer to cover the first electrode and the second electrode; a third electrode disposed on the insulting film facing the liquid crystal layer to correspond to the linear portion of the first electrode, the third electrode having a linear portion which has a portion overlapping with the linear portion of the first electrode and extends in a direction along the linear portion of the first electrode; and a fourth electrode disposed on the insulting film facing the liquid crystal layer and in a position adjacent to the third electrode to correspond to the linear portion of the second electrode, the fourth electrode having a linear portion which has a portion overlapping with the linear portion of the second electrode and extends in a direction along the linear portion of the second electrode. In the liquid crystal display, a voltage different from those of the second electrode and the third electrode is applied to the first electrode, and the first electrode and the second electrode are partially notched in the width direction of the linear portion in at least one side edge of the linear portion to form a concavo-convex shape.

With this configuration, the first electrode and the second electrode may be partially notched in the width direction of the linear portion in at least one side edge of the linear portion to form a concavo-convex shape. Therefore, it is possible to improve exposure margin upon manufacturing the first electrode and the second electrode, and to make the variation of V-T characteristics smaller (about half) even in the case there is more or less exposure variation. Further, it is also possible to lower the driving voltage by an electrode composition (interelectrode width or opposite electrode width) or an electrode position.

In addition, the first electrode is formed to have the linear portion overlapping with the third electrode in a planar view, and similarly and the second electrode is formed to have the linear portion overlapping with the fourth electrode in a planar view. Moreover, each electrode is connected to each other so that a voltage different from those applied to the second electrode and the third electrode is applied to the first electrode. Therefore, the two sets of the electrode pairs overlapping with each other via the insulating film in a planar view mutually have a relationship of arrangement similar to the case of the liquid crystal display having an FFS mode, and the electrode pair adjacent to each other in the same plane have a relationship of arrangement similar to the case of the liquid crystal display having an IPS mode.

In that case, capacitors are formed in each of two sets of the electrode pairs overlapping with each other via the insulating film in a planar view, and these capacitors are connected in parallel. As a result, a retention capacity is formed to be larger than that of a liquid crystal display having an FFS mode used as an example in the related art, to thereby obtain a liquid crystal display having small flickers. Moreover, since it is possible to drive liquid crystals in an FFS mode in all the electrodes, a bright display can be achieved. In addition, the symmetric property of an electrode is configured to be intermediate between an IPS mode and an FFS mode, and the occurrence of a direct current component is reduced, thus resulting in enhanced burn-in phenomena. In this way, there is provided a liquid crystal display having an FFS mode in which burn-in phenomena or flickers hardly occur, and the property of an IPS mode capable of performing a bright display is combined due to a large opening ratio. In this way, there is provided the liquid crystal display capable of enhancing (improving) the brightness or enhancing the driving voltage (a low driving voltage).

It is preferable that the width of the linear portion of the first electrode is thicker than that of the linear portion of the third electrode, and the width of the linear portion of the second electrode may be thicker than that of the linear portion of the fourth electrode.

With this configuration, a high applied voltage is needed due to the intense exhibition of characteristics of the liquid crystal display having an FFS mode. However, since good fringe fields are generated in all the electrodes, the liquid crystal display having a brighter display can be obtained. Moreover, when manufacturing the liquid crystal display according to such an aspect, the tolerance for set misalignment is larger when manufacturing the liquid crystal display, thus resulting in easier manufacture.

It is preferable that a convex portion of the concavo-convex shape formed in the linear portion of the first electrode is disposed so as to protrude in the width direction from the linear portion of the third electrode in a planar view, and a convex portion of the concavo-convex shape formed in the linear portion of the second electrode may be disposed so as to protrude in the width direction from the linear portion of the fourth electrode in a planar view.

With this configuration, when manufacturing the liquid crystal display according to such an aspect, the tolerance for set misalignment is larger when manufacturing the liquid crystal display, thus resulting in easier manufacture.

It is preferable that from a planar view, the width of the convex portion which is a protrusion of the linear portion of the first electrode from the linear portion of the third electrode is different from the width of the convex portion which is a protrusion of the linear portion of the second electrode from the linear portion of the fourth electrode within at least one of the sub-pixel regions.

With this configuration, an exposure margin can be obtained. In addition, since the tolerance for set misalignment is larger when manufacturing the liquid crystal display, the lowering of transmissivity due to the set misalignment can be reduced.

It is preferable that from a planar view, a plurality of the linear portions of the first electrode is formed in one of the sub-pixel regions, and the width of the convex portion protruding from the linear portion of the third electrode is different within at least one of the sub-pixel regions.

With this configuration, an exposure margin can be obtained. In addition, since the tolerance for set misalignment is larger when manufacturing the liquid crystal display, the lowering of transmissivity due to set misalignment can be reduced.

It is preferable that the width of the linear portion of the first electrode is equal to that of the linear portion of the third electrode.

With this configuration, the tolerance for position deviation of a mask in manufacturing is smaller, but the applied voltage can be lower. Moreover, since the fringe fields occur in all the electrodes, the liquid crystal display having a bright display can be obtained.

According to a second aspect of the invention, an electronic apparatus is provided including a display unit and a liquid crystal display mounted on the display unit.

With this configuration, since the above-described liquid crystal display is included in the display unit, a display having high quality can be performed.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, the embodiments of a liquid crystal display will be described with reference to the drawings. The drawings to be referred to in each of the embodiments are represented by making it different to scale up or down for each layer and each member in order to make each layer and each member have perceptible dimensions on the drawings.

First Embodiment

Figure 1:
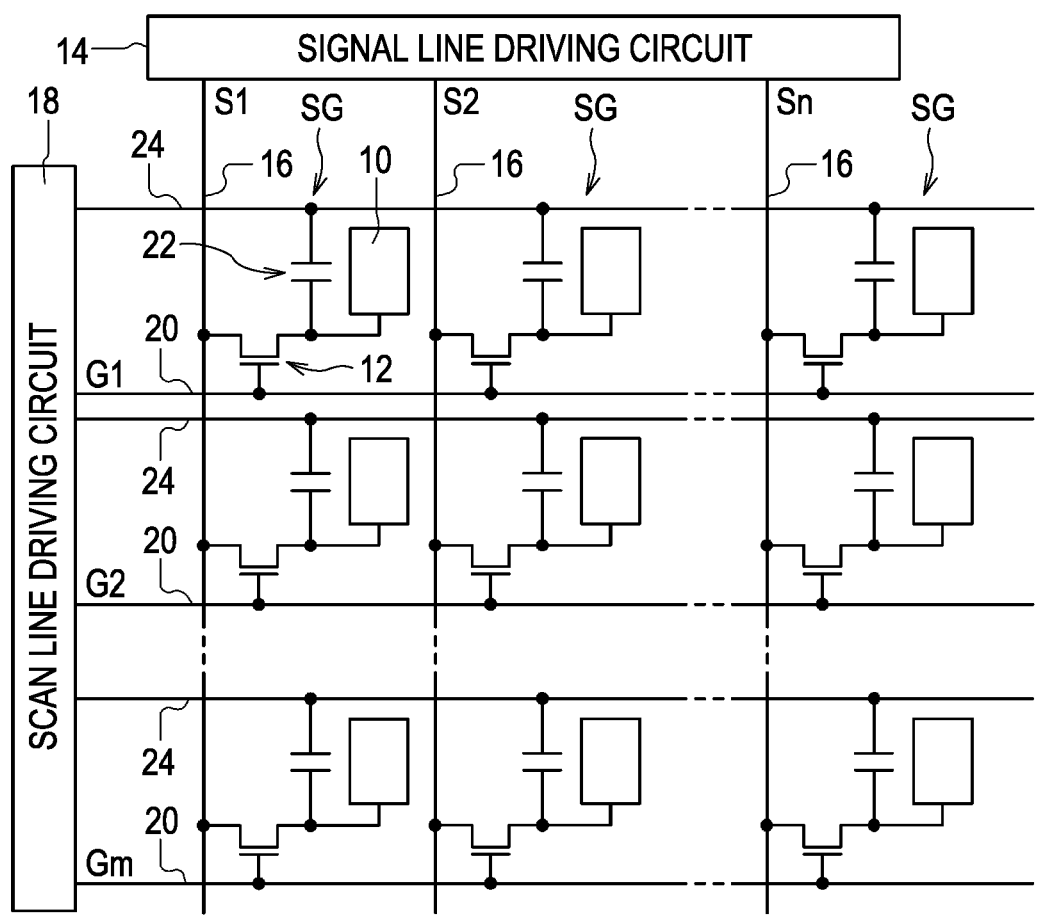
FIG. 1 is a circuit configuration diagram of a plurality of sub-pixel regions formed in the form of a matrix which constitute a liquid crystal display according to a first embodiment.

FIG. 1 is a circuit configuration diagram of a plurality of sub-pixel SG regions formed in the form of a matrix which constitute a liquid crystal display 2 according to the present embodiment.

A plurality of sub-pixel SG regions is disposed in the form of a matrix on image display regions of the liquid crystal display 2 according to the present embodiment. First electrodes 10 and TFTs 12 for controlling the switching of the first electrodes 10 are formed on each of the sub-pixel SG regions. Signal lines 16 extending from a signal line driving circuit 14 are electrically connected to the sources of the TFTs 12. The signal line driving circuit 14 supplies image signals S1, S2, . . . , Sn to each pixel via signal lines 16. The image signals S1 to Sn may be sequentially supplied in this order, and may be supplied for each group with respect to a plurality of signal lines 16 adjacent to each other.

In addition, scan lines 20 extending from a scan line driving circuit 18 are electrically connected to gates of the TFTs 12. The scan line driving circuit 18 supplies scan signals G1, G2, . . . , Gm to the scan lines 20 in a pulse manner at a predetermined timing. The scan signals G1 to Gm are sequentially applied to the gates of the TFTs 12 in this order. On the other hand, the first electrodes 10 are electrically connected to drains of the TFTs 12. Then, as the TFTs 12, which are used as switching elements, are put in an on-state for a certain period of time by the input of the scan signals G1, G2, . . . , Gm, the image signals S1, S2, . . . , Sn supplied from the signal lines 16 are written into the first electrodes 10 at a predetermined timing.

The image signals S1, S2, . . . , Sn of predetermined levels written into the liquid crystals through the first electrodes 10 are retained for a certain period of time by liquid crystal capacitors formed between the first electrodes 10 and common electrodes. Here, storage capacitors 22 are formed in parallel to the liquid crystal capacitors so as to prevent the retained image signals from leaking. These storage capacitors 22 are disposed between the drains of the TFTs 12 and capacitive lines 24.

Figure 2:
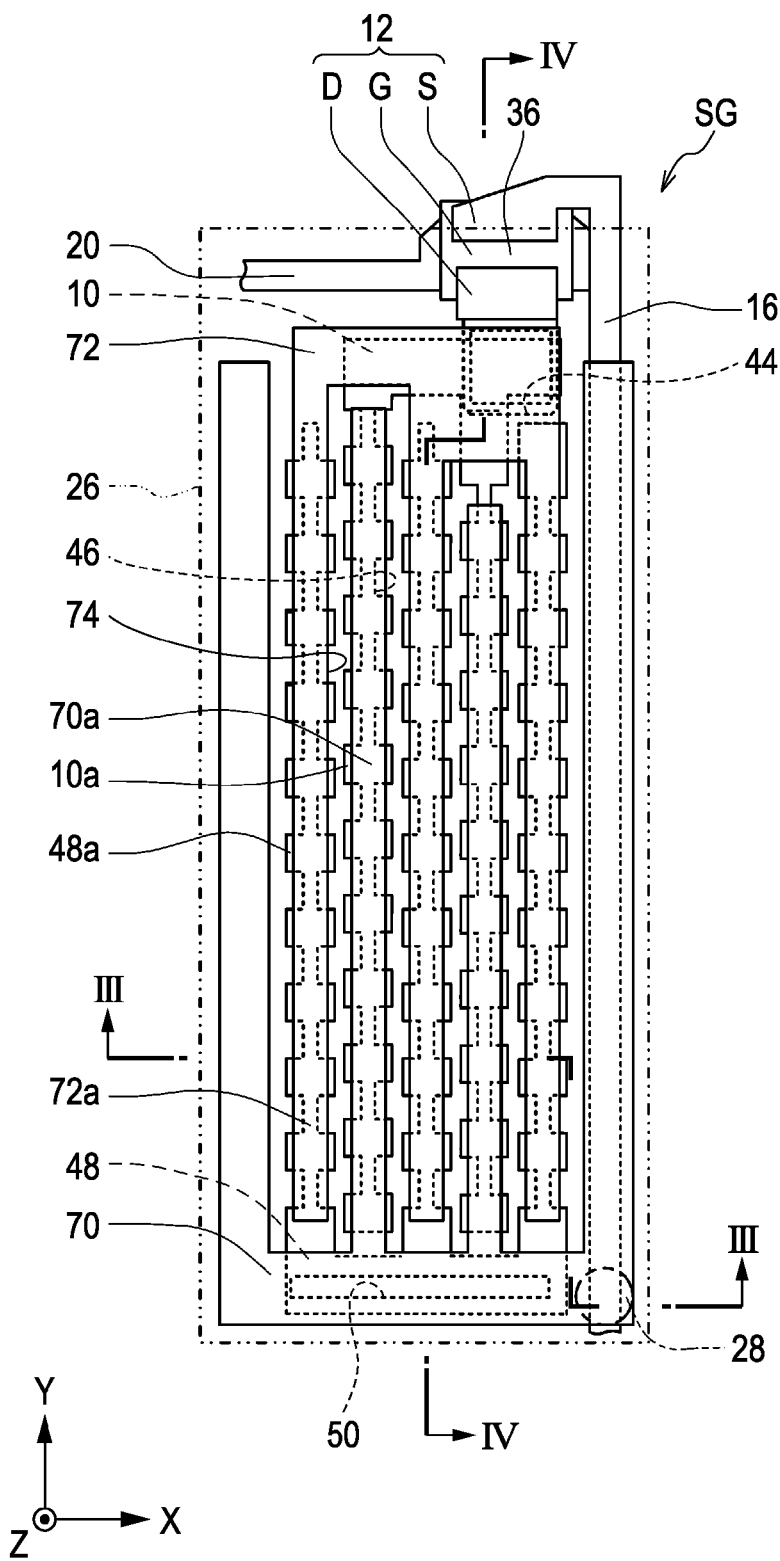
FIG. 2 is a plan view of one arbitrary sub-pixel which is perspectively represented through a color filter substrate of the liquid crystal display according to the first embodiment.
Figure 3:
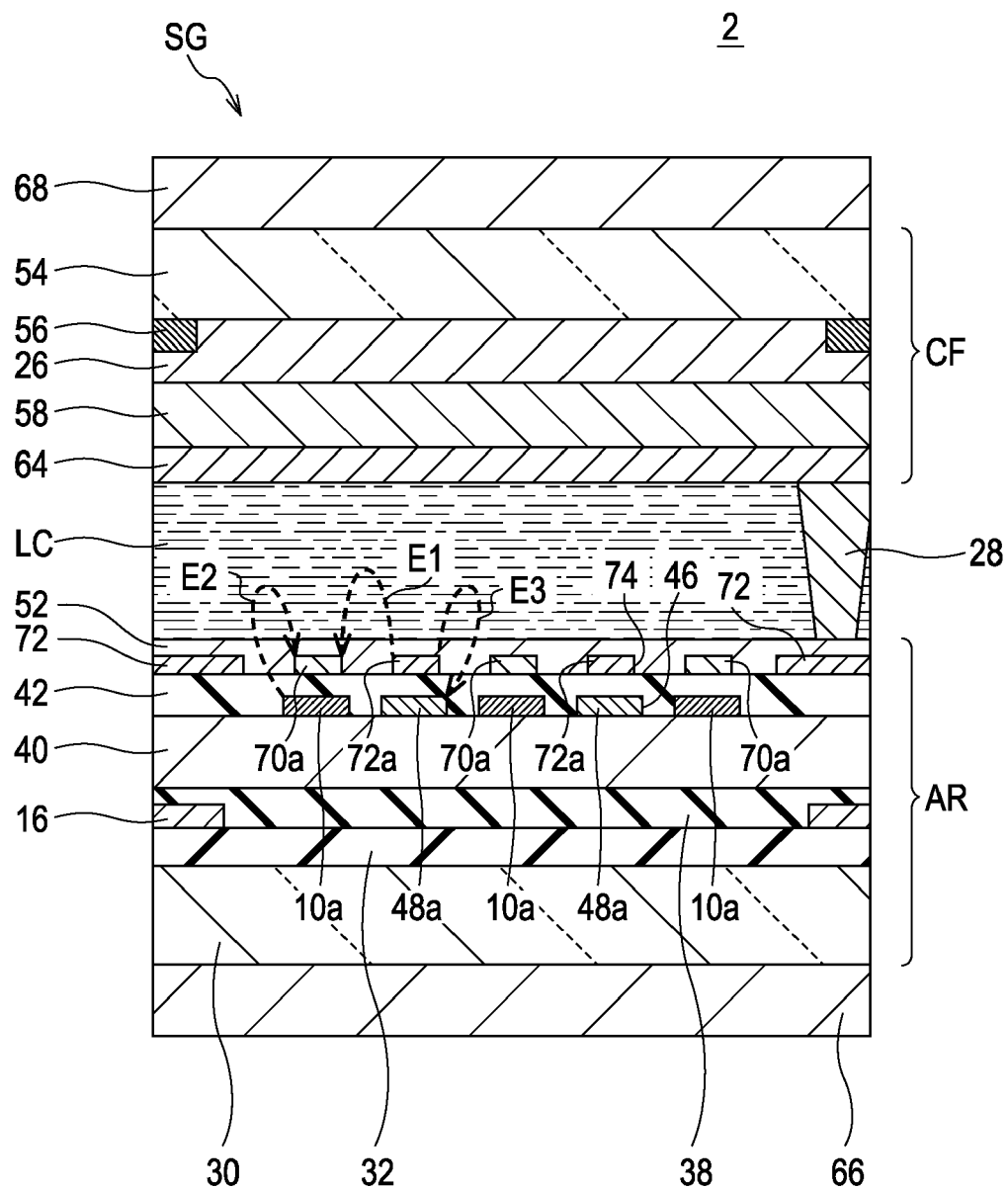
FIG. 3 is a partial cross-sectional configuration diagram taken along a line III-III of FIG. 2.
Figure 4:
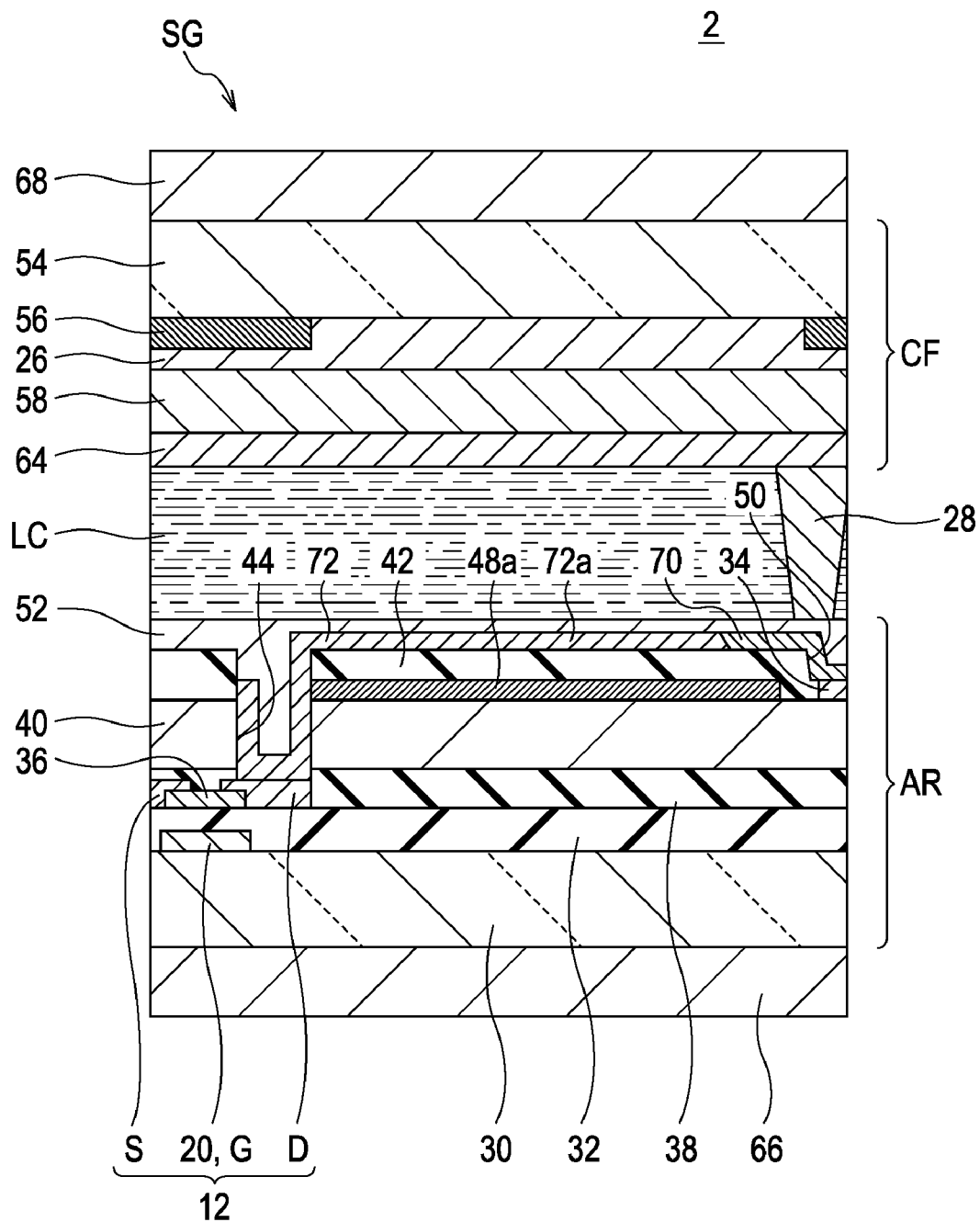
FIG. 4 is a partial cross-sectional configuration diagram taken along a line IV-IV of FIG. 2.
Figure 5:
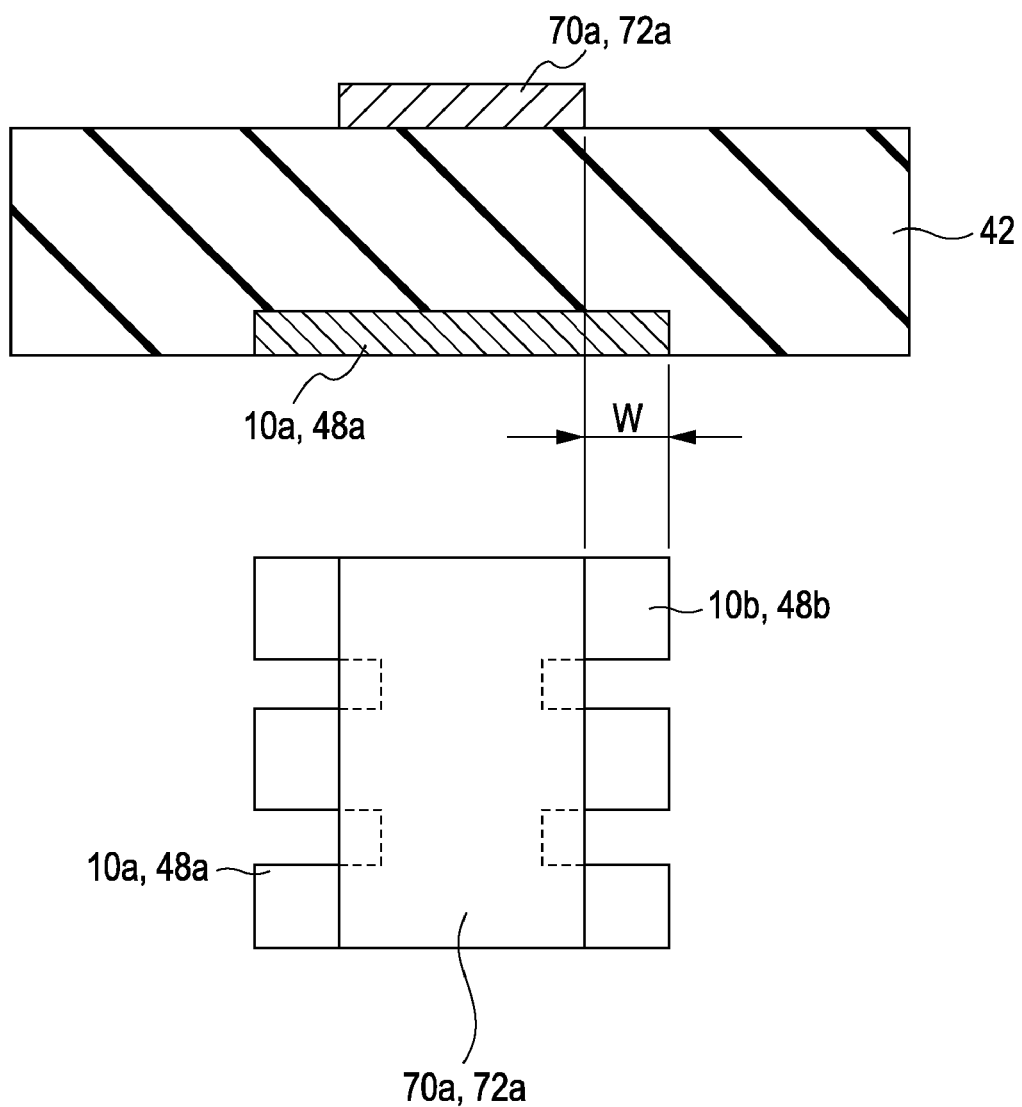
FIG. 5 is a portion of cross-sectional view of the liquid crystal display according to the first embodiment and a plan view thereof.
Figure 6:
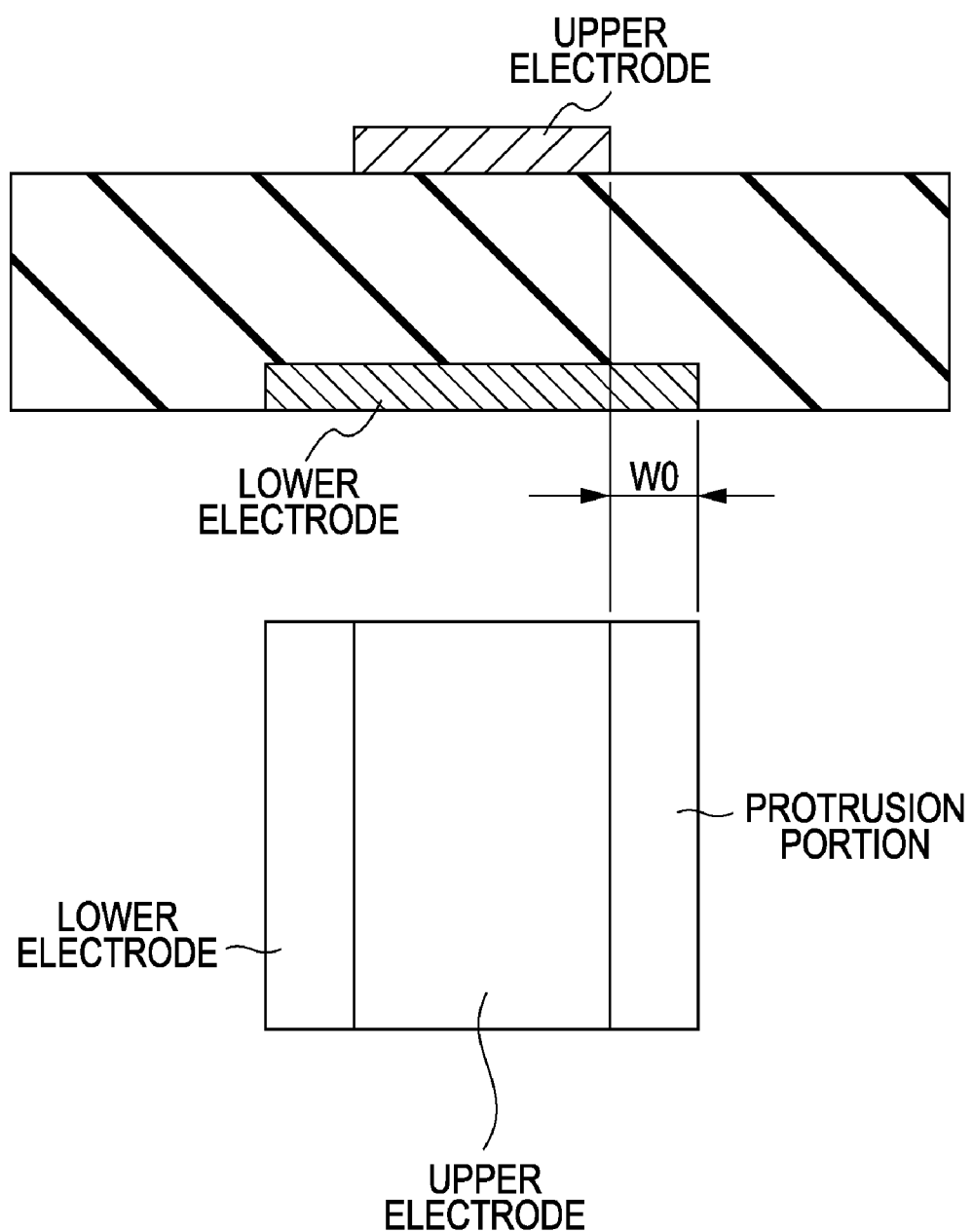
FIG. 6 is a portion of cross-sectional view of a liquid crystal display used as an example in the related art and a plan view thereof.

Next, referring to FIG. 2 to FIG. 4, plane and cross-sectional configurations of the liquid crystal display 2 will be described. FIG. 2 is a plan view of one arbitrary sub-pixel SG which is perspectively represented through a color filter substrate CF of the liquid crystal display 2 according to the present embodiment. FIG. 3 is a partial cross-sectional configuration diagram taken along the line III-III of FIG. 2, and FIG. 4 is a partial cross-sectional configuration diagram taken along the line IV-IV of FIG. 2. FIG. 5 is a portion of cross-sectional view of the liquid crystal display 2 according to the present embodiment and a plan view thereof. FIG. 6 is a portion of cross-sectional view of a liquid crystal display used as an example in the related art and a plan view thereof.

A color filter layer 26, having a planar shape substantially equal to the sub-pixel SG region, is disposed on the sub-pixel SG region of the liquid crystal display 2 according to the present embodiment. In addition, a columnar spacer 28, used for constantly retaining the thickness of the liquid crystal layer (cell gap) by separating an array substrate AR and an color filter substrate CF at a predetermined distance, is disposed upright in the lower right corner of the sub-pixel SG region as shown.

The liquid crystal display 2 includes the array substrate (first substrate) AR and the color filter substrate (second substrate) CF. The array substrate AR is constituted in such a manner that a plurality of scan lines 20 and signal lines 16 are formed on a surface of a display region of a first transparent substrate 30, such as a glass substrate, in the form of a matrix so as to intersect with each other in a state of being insulated by a gate insulating film 32, and that a common interconnection 34 is formed in a marginal portion of the display region. Each of the regions surrounded by these scan lines 20 and signal lines 16 makes up each pixel (referred to as "sub-pixel"). In addition, the TFT 12, for example, used as a switching element, is formed in the first transparent substrate 30 for each pixel. In this TFT 12, a semiconductor layer 36 is disposed on a surface of the scan line 20, a portion of the signal line 16 is extended so as to cover a portion of the surface of the semiconductor layer 36 to form a source electrode S, and the scan line portion of the lower side of the semiconductor layer 36 forms a gate electrode G. Further, in this TFT 12, a conductive layer overlapping with a portion of the semiconductor layer 36 forms a drain electrode D, and the drain electrode D is connected to the first electrode 10 and fourth electrode 72. The entire surface of the first transparent substrate 30, including the TFT 12, is coated with a passivation film 38 composed of, for example, a silicon nitride layer or a silicon oxide layer.

The planarizing film 40, composed of organic materials, is formed on a surface of the passivation film 38. The first electrode 10 and second electrode 48 are formed on the surface of the planarizing film 40, which each have linear portions 10a and 48a extending along the signal line so as to line up in parallel and interposing a first separation region 46 in each pixel. The first electrode 10 has a plurality of the linear portions 10a, and has a longitudinal direction in the Y-axis direction (an extended direction of the signal line 16/the interconnection supplying a signal). The second electrode 48 is formed adjacent to the first electrode 10. The second electrode 48 has a plurality of the linear portions 48a, and has a longitudinal direction in the Y-axis direction. One out of the first electrode 10 and the second electrode 48 may be composed of metal materials such as aluminum, but at least one of the two is preferably to be composed of transparent conductive materials such as ITO and IZO for the purpose of making the aperture ratio larger.

The first electrode 10 is electrically connected to the drain electrode D of the TFT 12 via a first contact hole 44, and the second electrode 48 is electrically connected to the common interconnection 34. Therefore, the first electrode 10 functions as a pixel electrode, and the second electrode 48 functions as an opposite electrode. Further, it is arbitrary which out of the first electrode 10 and the second electrode 48 is used as a pixel electrode. However, it is necessary that the electrode pair adjacent to each other in the same plane is a pairing of the pixel electrode and the opposite electrode.

The insulating film 42, composed of silicon nitride layer and silicon oxide layer, is formed over the entire surface of the first transparent substrate 30 on which the first electrode 10 and the second electrode 48 are formed. The first contact hole 44 is formed on the insulating film 42, the planarizing film 40 and the passivation film 38 in a position corresponding to the drain electrode D of the TFT 12.

The third electrode 70 and fourth electrode 72 are formed on the insulating film 42, which each have linear portions 70a and 72a extending along the signal line 16 so as to line up in parallel and sandwiching a second separation region 74 in each pixel. The third electrode 70 has a plurality of the linear portions 70a, and has a longitudinal direction in the Y-axis direction. The linear portions 70a of the third electrode 70 are disposed corresponding to the linear portions 10a of the first electrode 10, and have a portion overlapping with the linear portions 10a of the first electrode 10. The linear portions 70a of the third electrode 70 extend in a direction along the linear portions 10a of the first electrode 10. The fourth electrode 72 has a plurality of the linear portions 72a, and has a longitudinal direction in the Y-axis direction. The linear portions 72a of the fourth electrode 72 are disposed corresponding to the linear portions 48a of the second electrode 48 in a position adjacent to the third electrode 70, and have a portion overlapping with the linear portions 48a of the second electrode 48. The linear portions 72a of the fourth electrode 72 extend in a direction along the linear portions 48a of the second electrode 48. The third electrode 70 and the fourth electrode 72 are preferably formed of transparent conductive materials such as ITO and IZO in order to be capable of making the aperture ratio larger and making the display bright, but can also be formed of metal materials such as aluminum.

The fourth electrode 72 is electrically connected to the drain electrode D of the TFT 12 via the first contact hole 44, and the third electrode 70 is electrically connected to the common interconnection 34 via a second contact hole 50 formed in the insulating film 42. Therefore, in the liquid crystal display 2, the fourth electrode 72 functions as a pixel electrode, and the third electrode 70 functions as an opposite electrode. Further, it is arbitrary which of the third electrode 70 and the fourth electrode 72 is used as a pixel electrode. However, it is necessary that the electrode pair adjacent to each other in the same plane is a pairing of the pixel electrode and the opposite electrode.

Here, each linear portion 10a of the first electrode 10 and each linear portion 48a of the second electrode 48 are formed to overlap with each of the linear portions 72a of the fourth electrode 72 and each of the linear portions 70a of the third electrode 70 from a planar view.

In addition, widths of the linear portion 10a of the first electrode 10 and the linear portion 48a of the second electrode 48 are formed to be thicker than widths of the linear portion 70a of the third electrode 70 and the linear portion 72a of the fourth electrode 72. According to such a configuration, a high applied voltage is needed due to the intense exhibition of characteristics typical to that of a liquid crystal display having an FFS mode. However, since good fringe fields are generated in all the electrodes, the liquid crystal display having a brighter display can be obtained. Moreover, the tolerance is larger for the position deviation of a mask in the forming the first electrode 10 and the second electrode 48 on a surface of the insulating film 42 using a fringe field approach, thus resulting in easier manufacture.

Further, convex portions 10b in a concavo-convex shape (zigzag configuration) formed in the linear portions 10a of the first electrode 10 are disposed so as to protrude in the width direction from the linear portions 70a of the third electrode 70 in a planar view. Convex portions 48b in a concavo-convex shape formed in the linear portions 48a of the second electrode 48 are disposed so as to protrude in the width direction from the linear portions 72a of the fourth electrode 72 in a planar view. According to such a configuration, the tolerance for set misalignment is larger when manufacturing the liquid crystal display of such an aspect, thus resulting in easier manufacture. The liquid crystal display 2 according to the present embodiment is constituted so that the convex portions 10b formed in a concavo-convex shape are provided to both end edges of the side corresponding to a longitudinal direction of each linear portion 10a of the first electrode 10, as shown in FIG. 5. The convex portions 10b are disposed so as to protrude in the width direction from each linear portion 70a of the third electrode 70 in a planar view. For example, the protrusion width W of the convex portion 10b is 1.0 to 3.0 μm or so depending on the area of the convex portion 10b. In a configuration of a liquid crystal display used as an example in the related art as a comparative example in this connection, as shown in FIG. 6, the lower electrode width is formed to be slightly wider than the upper electrode width, and the protrusion width WO thereof was formed to be 0.5 to 1.5 μm or so. According to such a configuration formed in a concavo-convex shape, the protrusion width W can be made wider than the protrusion width WO by making the area of the convex portion of the configuration in the related art to be substantially equal to the area of the convex portion 10b of the first electrode 10. According to such a configuration, it is possible to improve the exposure margin of the first electrode 10 and make the variation of V-T characteristics smaller (about half) even in the case where there is more or less exposure variation, and also to achieve a bright display without raising the driving voltage. In addition, the protrusion width W and its distance from the third electrode 70 may be adjusted depending on the exposure limit (exposure apparatus) of the first electrode 10. Although the above description has been made with the first electrode 10, the same is true of the convex portion 48b which is a protrusion of each linear portion 48a of the second electrode 48 from each linear portion 72a of the fourth electrode 72.

Further, the widths of each linear portion 70a of the third electrode 70 and each linear portion 72a of the fourth electrode 72 may be formed to be equal to the widths of each linear portion 10a of the first electrode 10 and each linear portion 48a of the second electrode 48. According to such a configuration, although the tolerance for position deviation of a mask in manufacturing is smaller, the applied voltage may become lower. Moreover, since fringe fields occur in all the electrodes, the liquid crystal display 2 having a bright display can be obtained. In addition, there is no advantage to changing the widths of each linear portion 70a of the third electrode 70 and each linear portion 72a of the fourth electrode 72 relative to each other. For this reason, the widths of each linear portion 70a of the third electrode 70 and each linear portion 72a of the fourth electrode 72 may be formed to be substantially equal to each other.

Figure 12:
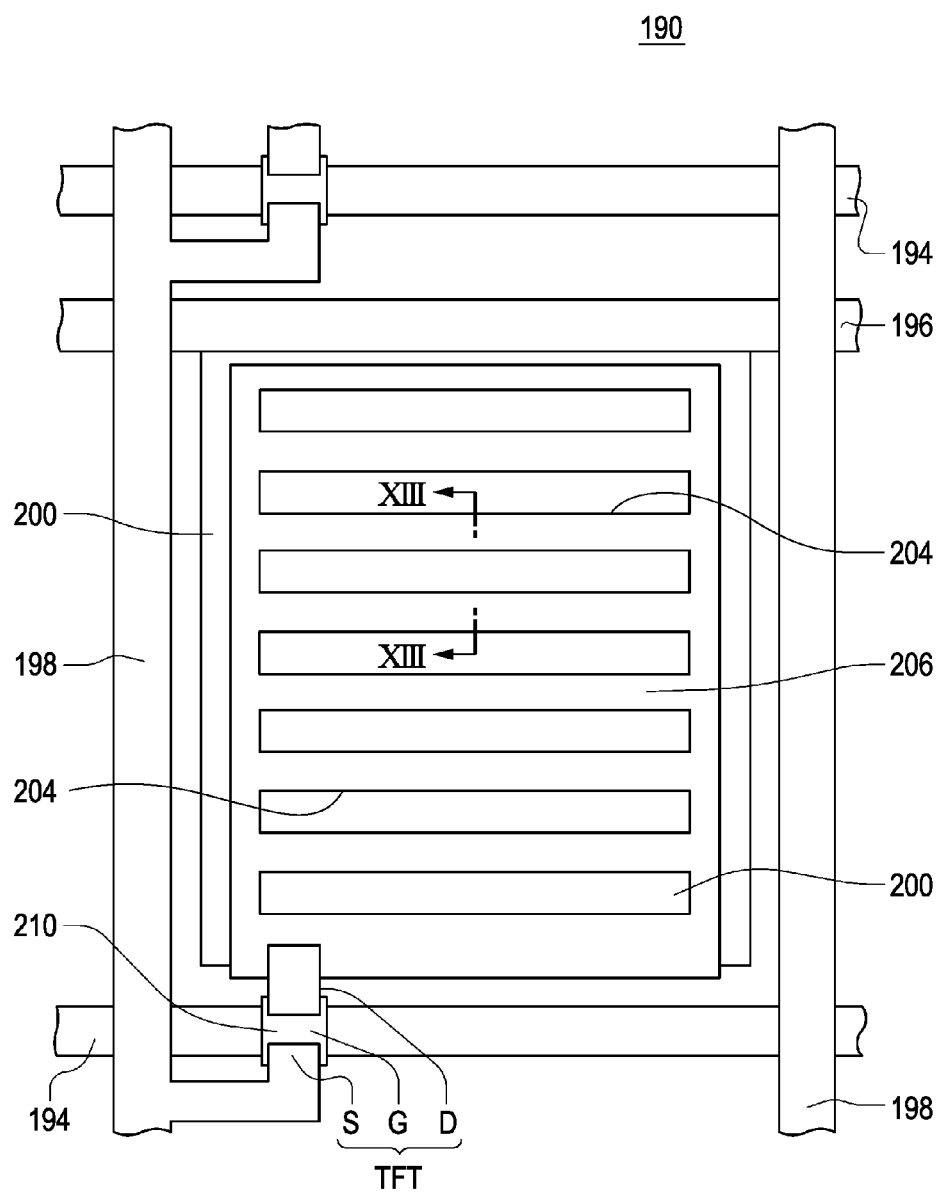
FIG. 12 is a schematic plan view of one pixel which is perspectively represented through a color filter substrate of a liquid crystal display having an FFS mode used as an example in the related art.
Figure 13:
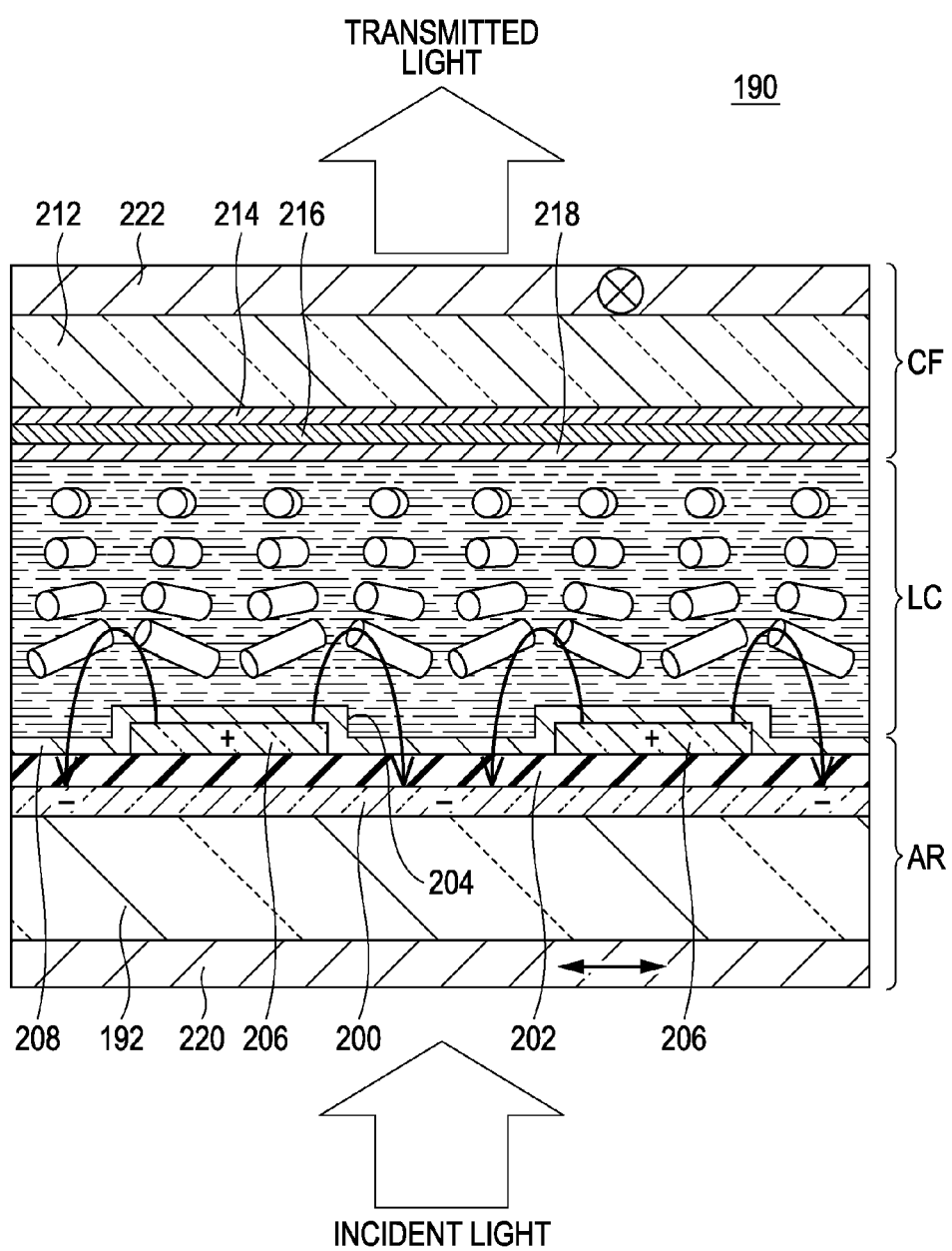
FIG. 13 is a cross-sectional view taken along a line XIII-XIII of FIG. 12.

The fourth electrode 72 is electrically connected to the drain electrode D of the TFT 12 via the first contact hole 44, and is also electrically connected to the first electrode 10. The third electrode 70 is electrically connected to the second electrode 48 via the second contact hole 50. In the end, the voltage different from those of the second electrode 48 and the third electrode 70 is applied to the first electrode 10. Therefore, pairs made of each linear portion 10a of the first electrode 10 and each linear portion 70a of the third electrode 70, and pairs made of each linear portion 48a of the second electrode 48 and each linear portion 72a of the fourth electrode 72, which overlap with each other from a planar view, mutually have a relationship of arrangement similar to the case of a liquid crystal display 190 having an FFS mode used as an example in the related art shown in FIG. 12 and FIG. 13. Further, pairs made of each linear portion 10a of the first electrode 10 and each linear portion 48a of the second electrode 48, and pairs made of each linear portion 70a of the third electrode 70 and each linear portion 72a of the fourth electrode 72, which are adjacent to each other in the same plane, mutually have a relationship of arrangement similar to the case of a liquid crystal display having an IPS mode.

A first oriented film 52 is formed over the entire display region including the surfaces of the third electrode 70 and the fourth electrode 72.

Further, the color filter substrate CF is constituted so that a light shielding film 56 is formed on the surface of the second transparent substrate 54 such as a glass substrate so as to coat a position corresponding to the scan lines 20, the signal lines 16, the first contact hole 44, the second contact hole 50, and the TFT 12 of the array substrate AR. The color filter layer 26 of a predetermined color is formed on the surface of the second transparent substrate 54 surrounded by the light shielding film 56. In addition, an overcoat layer 58 is formed to coat surfaces of the light shielding film 56 and the color filter layer 26. A second oriented film 64 is formed on the surface of the overcoat layer 58.

The array substrate AR and the color filter substrate CF are opposite to each other, and the liquid crystal LC is sealed therebetween. As materials of the liquid crystal LC, dielectric anisotropy may either use negative liquid crystal materials and positive liquid crystal materials, but it is preferable that dielectric anisotropy uses negative liquid crystal materials. This is because, when dielectric anisotropy uses negative liquid crystal materials, the field of view in applying a selective voltage (voltage on) can be expanded to thereby make it possible not to damage display characteristics of a display device. Further, dielectric anisotropy of the liquid crystal uses negative liquid crystal materials so that the influence of a vertical electric field caused by set misalignment can be made smaller, and the tolerance for set misalignment can be improved.

A first polarizing plate 66 and a backlight device (not shown) are disposed on an external side of the array substrate AR, and a second polarizing plate 68 is disposed on an external side of the color filter substrate CF, to thereby complete the liquid crystal display 2. Further, a retardation plate, if necessary, may be disposed between each substrate AR, CF and the polarizing plate 66, 68.

Next, an operation of the liquid crystal display 2 will be described. The liquid crystal display 2 is constituted so that the first electrode 10 and the fourth electrode 72 function as pixel electrodes, and the second electrode 48 and the third electrode 70 operate as opposite electrodes. Each linear portion 10a of the first electrode 10 and each linear portion 70a of the third electrode 70 overlap with each other via the insulating film 42 in a planar view, and each linear portion 48a of the second electrode 48 and each linear portion 72a of the fourth electrode 72 overlap with each other via the insulating film 42 in a planar view. Therefore, when the liquid crystal display 2 is in the operating condition, as shown in FIG. 3, an electric field E1 is applied between each linear portion 72a of the fourth electrode 72 and each linear portion 70a of the third electrode 70, and an electric field E2 is applied between each linear portion 10a of the first electrode 10 and each linear portion 70a of the third electrode 70. Further, an electric field E3 in a direction opposite to electric field E2 is applied between each linear portion 72a of the fourth electrode 72 and each linear portion 48a of the second electrode 48.

An operation by electric field E1 applied between each linear portion 72a of the fourth electrode 72 and each linear portion 70a of the third electrode 70 is similar to the case of a liquid crystal display having an IPS mode used as an example in the related art. Therefore, the liquid crystal display 2 operates as a liquid crystal display having an IPS mode between each linear portion 72a of the fourth electrode 72 and each linear portion 70a of the third electrode 70. Moreover, an operation by electric field E2 applied between each linear portion 10a of the first electrode 10 and each linear portion 70a of the third electrode 70, and an operation by electric field E3 applied between each linear portion 72a of the fourth electrode 72 and each linear portion 48a of the second electrode 48 are similar to the case of a liquid crystal display having an FFS mode used as an example in the related art shown in FIG. 12 and FIG. 13. Therefore, the liquid crystal display 2 operates as a liquid crystal display having an FFS mode between each linear portion 10a of the first electrode 10 and each linear portion 70a of the third electrode 70 and between each linear portion 72a of the fourth electrode 72 and each linear portion 48a of the second electrode 48.

Comparison of Characteristics of Transmissivity to Driving Voltage

Figure 7:
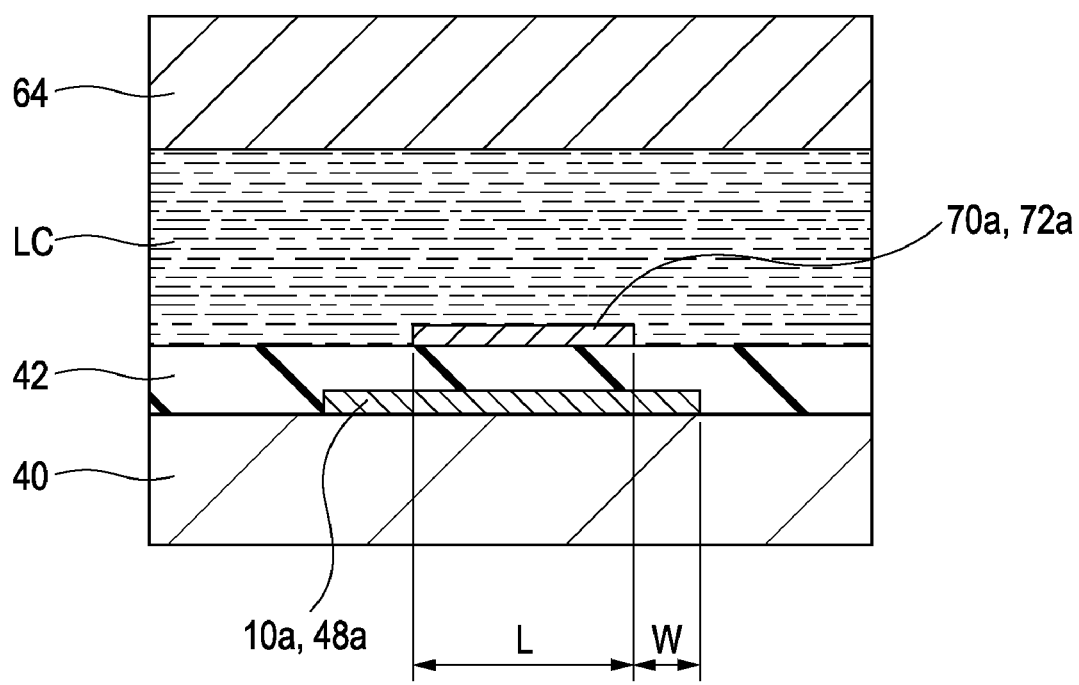
FIG. 7 is a cross-sectional view of the liquid crystal display according to the first embodiment.
Figure 8:
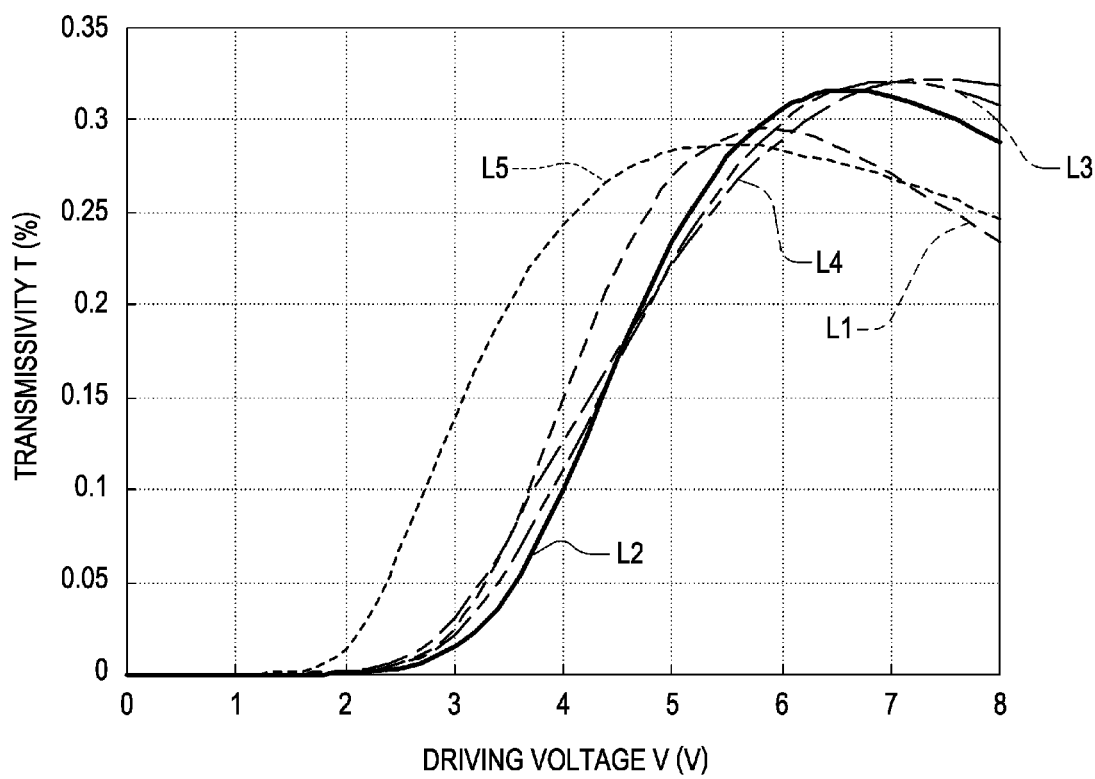
FIG. 8 is a graph of the characteristics of transmissivity T to the driving voltage V with respect to changes in the protrusion widths of the convex portions of the liquid crystal display according to the first embodiment.
Figure 9:
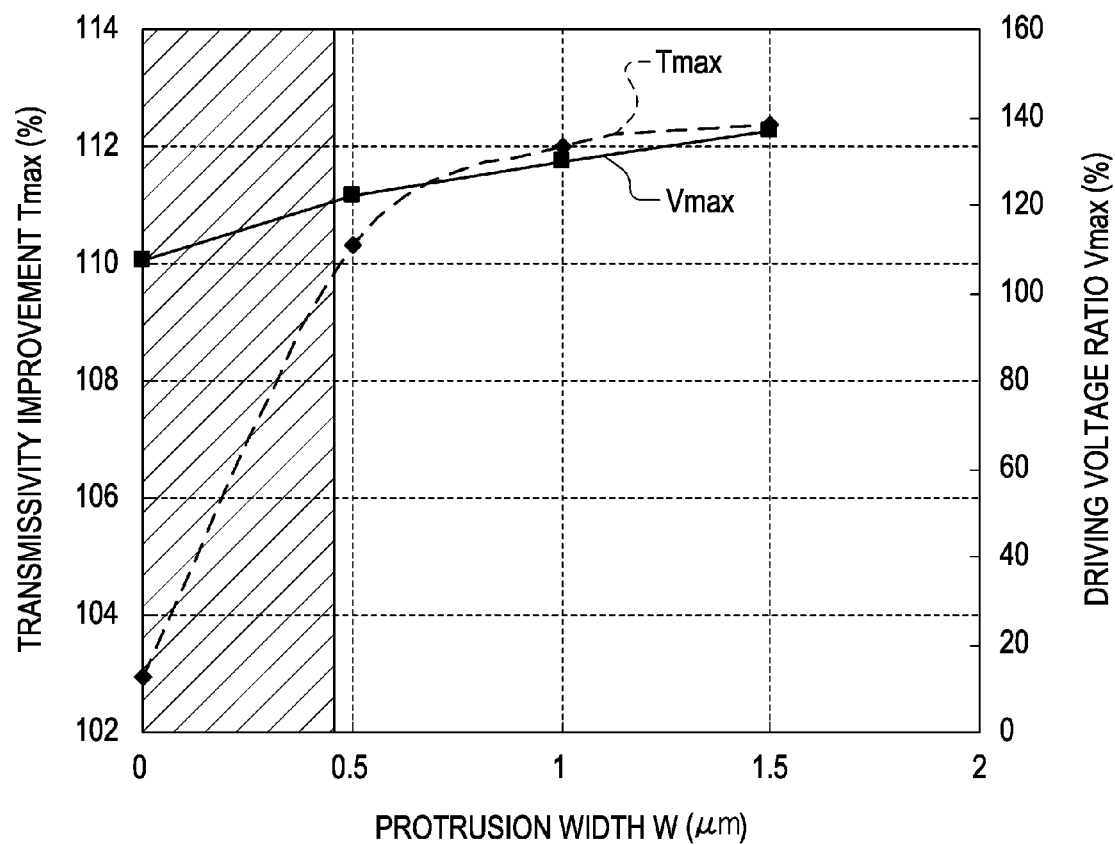
FIG. 9 is a graph of transmissivity improvements and driving voltage ratios with respect to changes in the protrusion widths of the convex portions of the liquid crystal display according to the first embodiment.

FIG. 7 is a cross-sectional view of the liquid crystal display 2 according to the present embodiment. FIG. 8 is a graph of characteristics of transmissivity T to the driving voltage V with respect to changes in the protrusion width W of the convex portion 10b of the liquid crystal display 2 according to the present embodiment. FIG. 9 is a graph of the transmissivity improvement Tmax and driving voltage ratio Vmax with respect to changes in the protrusion width W of the convex portion 10b of the liquid crystal display 2 according to the present embodiment. Each of the graphs shown in FIG. 8 and FIG. 9 represent the case in which the width L of the linear portion 70a of the third electrode 70 shown in FIG. 7 is set to 2 μm. In FIG. 7, the first oriented film 52 is omitted for easy viewing of the drawing.

Graph L1 shown in FIG. 8 represents the characteristics of transmissivity T to driving voltage V of the liquid crystal display 2 at the protrusion width W=0 (μm), graph L2 represents the characteristics of transmissivity T to driving voltage V of the liquid crystal display 2 at the protrusion width W=0.5 (μm), graph L3 represents the characteristics of transmissivity T to driving voltage V of the liquid crystal display 2 at the protrusion width W=1.0 (μm), graph L4 represents the characteristics of transmissivity T to driving voltage V of the liquid crystal display 2 at the protrusion width W=1.5 (μm), and graph L5 represents the characteristics of transmissivity T to driving voltage V of a liquid crystal display having an FFS mode used as an example in the related art.

Comparing the graphs L1 to L5 representing the characteristics of transmissivity T to driving voltage V to each other, the characteristics of transmissivity T to driving voltage V vary to a great extent in the size of the protrusion width W. When the protrusion width W>0, transmissivity T becomes high, and driving voltage V becomes very high, compared to a liquid crystal display having an FFS mode used as an example in the related art.

Furthermore, when the protrusion width W<0, the effect of transmissivity improvement Tmax is small, as shown in FIG. 9. Therefore, the protrusion width W is preferably set to 0<protrusion width W<1. It is more preferable to be set to 0.4<protrusion width W<1 which does not include diagonal regions shown in FIG. 9. Although the above description has been made with the first electrode 10, the same is true of the convex portion 48b which is a protrusion of each linear portion 48a of the second electrode 48 from each linear portion 72a of the fourth electrode 72.

According to the present embodiment, it is possible to improve exposure margin of the first electrode and make the variation of V-T characteristics smaller (about half) even in the case where there is more or less exposure variation, and also to achieve a bright display without raising the driving voltage. As a result, it is possible to improve transmissivity without excessively lessening the first separation region 46 of the array substrate AR side. Further, it is also possible to lower the driving voltage through the electrode composition (inter-electrode width or opposite electrode width) or the electrode position. In this way, there is provided the liquid crystal display 2 capable of enhancing (improving) brightness or enhancing the driving voltage (a low driving voltage).

Second Embodiment

Figure 10:
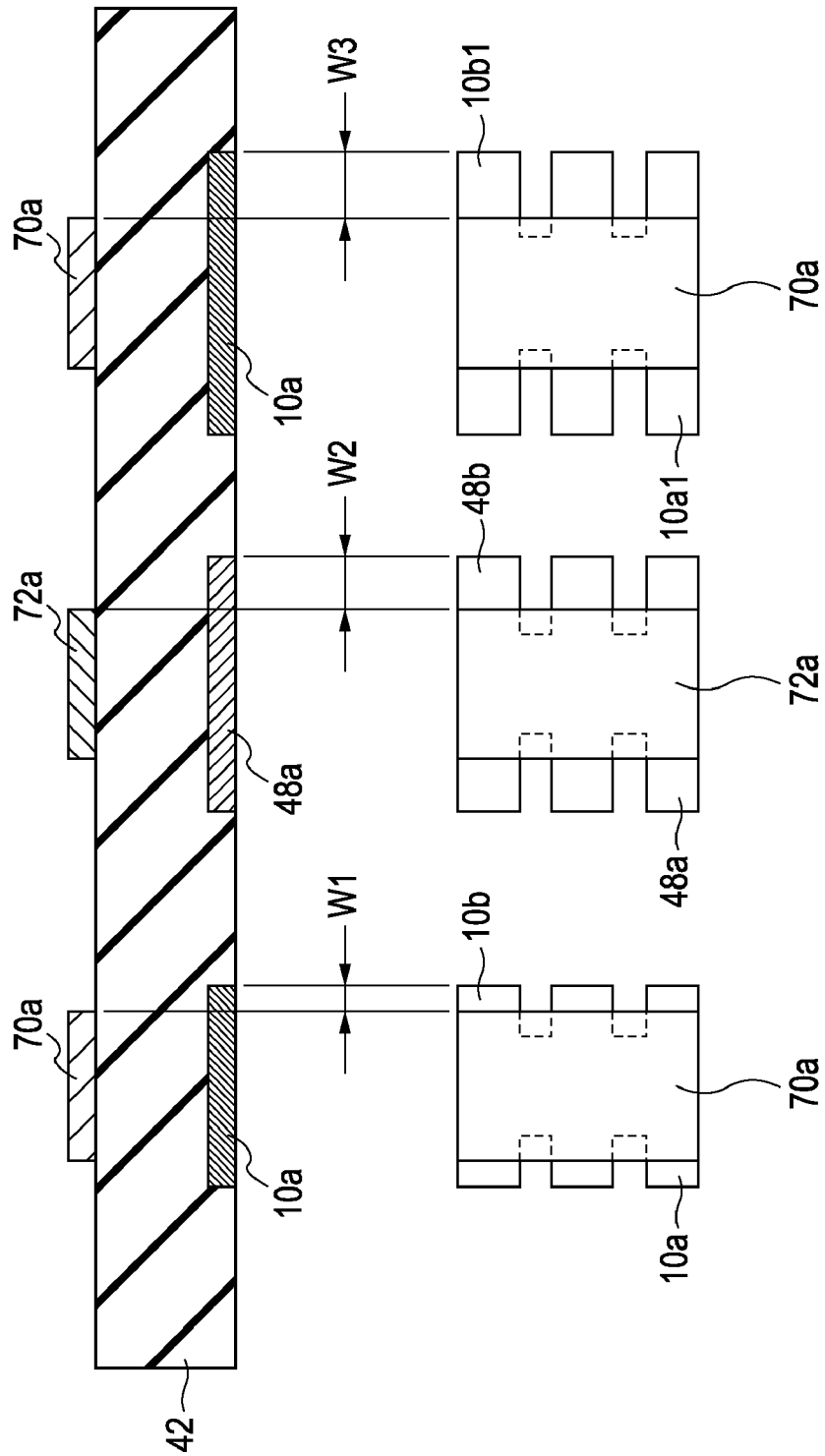
FIG. 10 is a portion of cross-sectional view of a liquid crystal display according to a second embodiment and a plan view thereof.

Next, reference is made to FIG. 10 to describe a liquid crystal display 4 according to a second embodiment. FIG. 10 is a portion of a cross-sectional view of the liquid crystal display 4 according to the present embodiment and a plan view thereof. In FIG. 10, component parts equal to those of the liquid crystal display 2 of the first embodiment shown in FIG. 5 are given the same reference numbers, and detailed description thereof is omitted.

The compositional difference of the liquid crystal display 4 according to the present embodiment and the liquid crystal display 2 according to the first embodiment is that the widths of each of linear portions 10a and 48a of the first electrode 10 and the second electrode 48 are formed to be substantially equal to each other in the liquid crystal display 2 of the first embodiment, but the widths of each of linear portions 10a and 48a of the first electrode 10 and the second electrode 48 are formed to be different from each other in the liquid crystal display 4 of the present embodiment.

In the liquid crystal display 4, from a planar view, the width of the convex portion 10b which is a protrusion of the linear portion 10a of the first electrode 10 from the linear portion 70a of the third electrode 70 is different within at least one of the sub-pixel SG regions from the width of the convex portion 48b which is a protrusion of the linear portion 48a of the second electrode 48 from the linear portions 72a of the fourth electrode 72.

Further, from a planar view, a plurality of the linear portions 10a of the first electrode 10 is formed in one sub-pixel SG region, and the width of the convex portion 10b protruding from the linear portion 70a of the third electrode 70 is different within at least one of the sub-pixel SG regions. For example, as shown in FIG. 10, the relationship of between the protrusion width W1 of the convex portion 10b of the linear portion 10a, the protrusion width W2 of the convex portion 48b of the linear portion 48a, and the protrusion width W3 of the convex portion 10b1 of the linear portion 10a1 is such that protrusion width W1<protrusion width W2<protrusion width W3.

According to the present embodiment, an exposure margin can be further obtained in comparison to the first embodiment.

Electronic Apparatus

Figure 11:
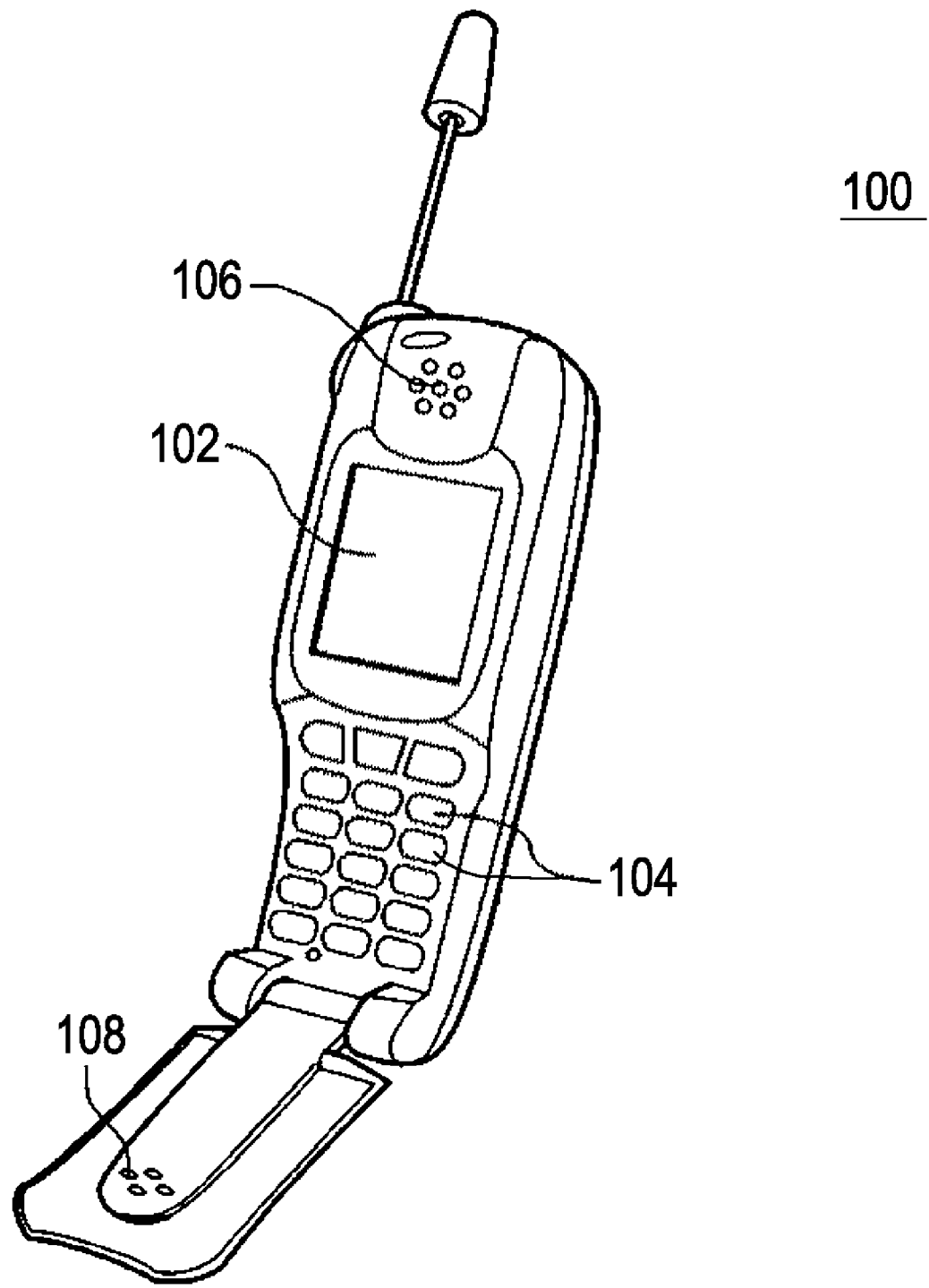
FIG. 11 is a perspective view of a cellular phone which is one example of an electronic apparatus including a display unit and the liquid crystal display according to the present embodiment mounted on the display unit.

Next, an electronic apparatus including the above-mentioned liquid crystal display will be set forth. FIG. 11 is a perspective view of a cellular phone 100 which is one example of an electronic apparatus including a display unit and the liquid crystal display according to the present embodiment on the display unit.

The cellular phone 100 according to the present embodiment is configured to include the liquid crystal display of the above embodiment as a display unit 102 having a small size, and to include a plurality of operational buttons 104, earphone 106 and microphone 108. Since the cellular phone 100 is configured to include the liquid crystal display according to the embodiment described above, an electronic apparatus having an excellent display quality can be provided.

In addition, a liquid crystal display according to the above-described embodiment, without restriction to the mentioned cellular phone, can be suitably used in various image display means such as an electronic book, a personal computer, a digital still camera, an LCD television, a view finder type or a monitor direct-view type videotape recorder, a car navigation device, a pager, an electronic organizer, a calculator, a word processor, a workstation, a videophone, a POS terminal, a device equipped with a touch panel or the like, and an electronic apparatus having an excellent display quality can be provided even in any of the electronic apparatuses.

As described above, although the embodiments or aspects of the invention have been described, the following, for example, may be considered as a modified example.

Modified Example

The liquid crystal display according to the above-described embodiment is a transmission-type liquid crystal display, but it is not intended to limit this. For example, a reflection-type or semi-transmissive reflection-type liquid crystal display may also be used.

The entire disclosure of Japanese Patent application No. 2008-267145, field Oct. 16, 2008 is expressly incorporated by reference herein.

What is claimed is:

1. A liquid crystal display in which a liquid crystal layer is interposed between a first substrate and a second substrate to constitute a plurality of sub-pixel regions, comprising:
   a first electrode having a linear portion foil ied in the first substrate facing the liquid crystal layer, the first electrode is partially notched in the width direction of the linear portion in at least one side edge of the linear portion to form a concavo-convex shape;
   a second electrode having a linear portion formed adjacent to the first electrode, the second electrode is partially notched in the width direction of the linear portion in at least one side edge of the linear portion to form a concavo-convex shape;
   an insulating film disposed on the first electrode and the second electrode facing the liquid crystal layer to cover the first electrode and the second electrode;
   a third electrode disposed on the insulting film facing the liquid crystal layer to correspond to the linear portion of the first electrode, the third electrode having a linear portion which as a portion overlapping with the linear portion of the first electrode and extends in a direction along the linear portion of the first electrode; and
   a fourth electrode disposed on the insulting film facing the liquid crystal layer and in a position adjacent to the third electrode to correspond to the linear portion of the second electrode, the fourth electrode having a linear portion which has a portion overlapping with the linear portion of the second electrode and extends in a direction along the linear portion of the second electrode;
   wherein a voltage different from those of the second electrode and the third electrode is applied to the first electrode, wherein the width of the linear portion of the first electrode is wider that that the width of the linear portion of the third electrode by an amount W that satisfies 0 μm<W<1 μm, and the width of the linear portion of the second electrode is also wider than the width of the linear portion of the fourth electrode by W, and wherein the notches of the first electrode and the notches of the second electrode have a width that is greater than W.

2. The liquid crystal display according to claim 1, wherein a convex portion of the concavo-convex shape formed in the linear portion of the first electrode is disposed so as to protrude in the width direction from the linear portion of the third electrode in a planar view, and a convex portion of the concavo-convex shape formed in the linear portion of the second electrode is disposed so as to protrude in the width direction from the linear portion of the fourth electrode in a planar view.

3. The liquid crystal display according to claim 2, wherein from a planar view, the width of the convex portion which is a protrusion of the linear portion of the first electrode from the linear portion of the third electrode is different from the width of the convex portion which is a protrusion of the linear portion of the second electrode from the linear portion of the fourth electrode within at least one of the sub-pixel regions.

4. The liquid crystal display according to claim 2, wherein from a planar view, a plurality of the linear portions of the first electrode is formed in one of the sub-pixel regions, and the width of the convex portion protruding from the linear portion of the third electrode is different within at least one of the sub-pixel regions.

5. An electronic apparatus, comprising:
A display unit; and
The liquid crystal display according to claim 1 mounted on the display unit.

* * * * *